(12) United States Patent
Hurwitz

(10) Patent No.: US 6,856,963 B1
(45) Date of Patent: Feb. 15, 2005

(54) FACILITATING ELECTRONIC COMMERCE THROUGH AUTOMATED DATA-BASED REPUTATION CHARACTERIZATION

(75) Inventor: Roger A. Hurwitz, Portland, OR (US)

(73) Assignee: Intel Corporation, Santa Clara, CA (US)

(*) Notice: Subject to any disclaimer, the term of this patent is extended or adjusted under 35 U.S.C. 154(b) by 292 days.

(21) Appl. No.: 09/481,740

(22) Filed: Jan. 11, 2000

(51) Int. Cl.[7] .............................................. G06F 17/60
(52) U.S. Cl. ............................ 705/10; 705/1; 705/11
(58) Field of Search .................................. 705/1, 10, 11

(56) References Cited

U.S. PATENT DOCUMENTS 6,253,189 B1 * 6/2001 Feezell et al. ................ 705/14

FOREIGN PATENT DOCUMENTS

WO   WO 01/161601 A1 * 8/2001   ........... G06F/17/60

OTHER PUBLICATIONS eBay Online Auction Marketplace. http://www.ebay.com; 1995–2002 . Retrieved May 01, 2002 [online].*

The Internet Archive: Wayback Machine. http://www.archive.org/ (2002). Retrieved May 12, 2002 [online].*

* cited by examiner

*Primary Examiner*—James P. Trammell
*Assistant Examiner*—James A. Reagan
(74) *Attorney, Agent, or Firm*—Steven P. Skabrat

(57) ABSTRACT

The present invention addresses the problem of using reputation to establish trust between strangers in a person-to-person transaction in an electronic commerce system without the drawbacks of subjective reputation feedback systems. The present invention generates objective feedback for transaction participants by monitoring their actual behavior at a variety of well-defined points in the transaction, such as payment and shipping. An objective reputation characterization system for use in a person-to-person electronic commerce system is disclosed. The system includes a data capture component to receive a first notification of a deadline relating to a transaction event and to receive a second notification of the transaction event occurring corresponding to the deadline, and an analysis component to build an objective reputation profile of a transaction participant based at least in part on the notifications.

26 Claims, 3 Drawing Sheets

FACILITATING ELECTRONIC COMMERCE THROUGH AUTOMATED DATA-BASED REPUTATION CHARACTERIZATION

BACKGROUND

1. Field

The present invention relates generally to electronic commerce systems and methods and, more specifically, to characterization of the reputations of buyers and sellers in an electronic commerce system.

2. Description

Trust plays a significant part in any "on-line" or electronic commercial transaction. When a consumer enters into a commercial transaction over a public communications network such as the Internet, the consumer makes an assumption that once a transaction occurs that the merchandise will in fact be delivered or that payment will be received. This is in stark contrast to an "in-person" transaction where the merchandise is typically within reach of the consumer at the point of sale or cash or checks physically change hands. While the problem of effectively establishing trust pervades all Internet commercial transactions, it is particularly acute in the case of person-to-person electronic commerce.

Person-to-person electronic commerce, as epitomized by on-line private party auction web sites, lacks the trust mechanisms prevalent in business-to-person commerce. Individuals, for example, may be comfortable buying merchandise from an established and well-known on-line merchant because of the merchant's reputation, but buying from a private party seller is more problematic. Private party sellers lack the ability to create for themselves a reputation that will instill a sense of trust in a potential buyer. Various private party auction web sites have addressed this concern through the means of subjective reputation feedback systems.

A subjective reputation feedback system, typically provided by the auction site itself, allows person-to-person transaction participants to provide feedback on their transaction partners. In theory, satisfied participants rate each other highly, dissatisfied participants rate each other poorly, and potential new transaction participants can use these ratings as a way to gauge the trustworthiness of someone they have not done business with themselves. In practice, these systems work fairly well, but are hindered by the subjective and sometimes vague nature of the feedback. Collusion, animosity, and "you-scratch-my-back, I'll-scratch-yours" scenarios abound in these systems, calling into question their essential validity.

Therefore, there is a need for a method and system for objectively characterizing the reputation of buyers and sellers in person-to-person electronic commerce.

SUMMARY

An embodiment of the present invention is an objective reputation characterization system for use in a person-to-person electronic commerce system. The system includes a data capture component to receive a first notification of a deadline relating to a transaction event and to receive a second notification of the transaction event occurring corresponding to the deadline, and an analysis component to build an objective reputation profile of a transaction participant based at least in part on the notifications.

Other embodiments are described and claimed.

BRIEF DESCRIPTION OF THE DRAWINGS

The features and advantages of the present invention will become apparent from the following detailed description of the present invention in which.

DETAILED DESCRIPTION

An embodiment of the present invention addresses the problem of using reputation to establish trust between strangers in a person-to-person transaction in an electronic commerce system without the drawbacks of subjective reputation feedback systems. The present invention generates objective feedback for transaction participants by monitoring their actual behavior at a variety of well-defined points in the transaction, such as payment and shipping. Timely payments, for example, may upgrade a buyer's rating, while late payments, or defaults may downgrade the buyer's reputation. Delayed shipment of goods, for example, may downgrade a seller's rating, while prompt shipment may upgrade a seller's rating. Performance metrics may be unobtrusively gathered by embodiments of the present invention without the bias, error, and hassle endemic in current subjective feedback reputation feedback systems.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
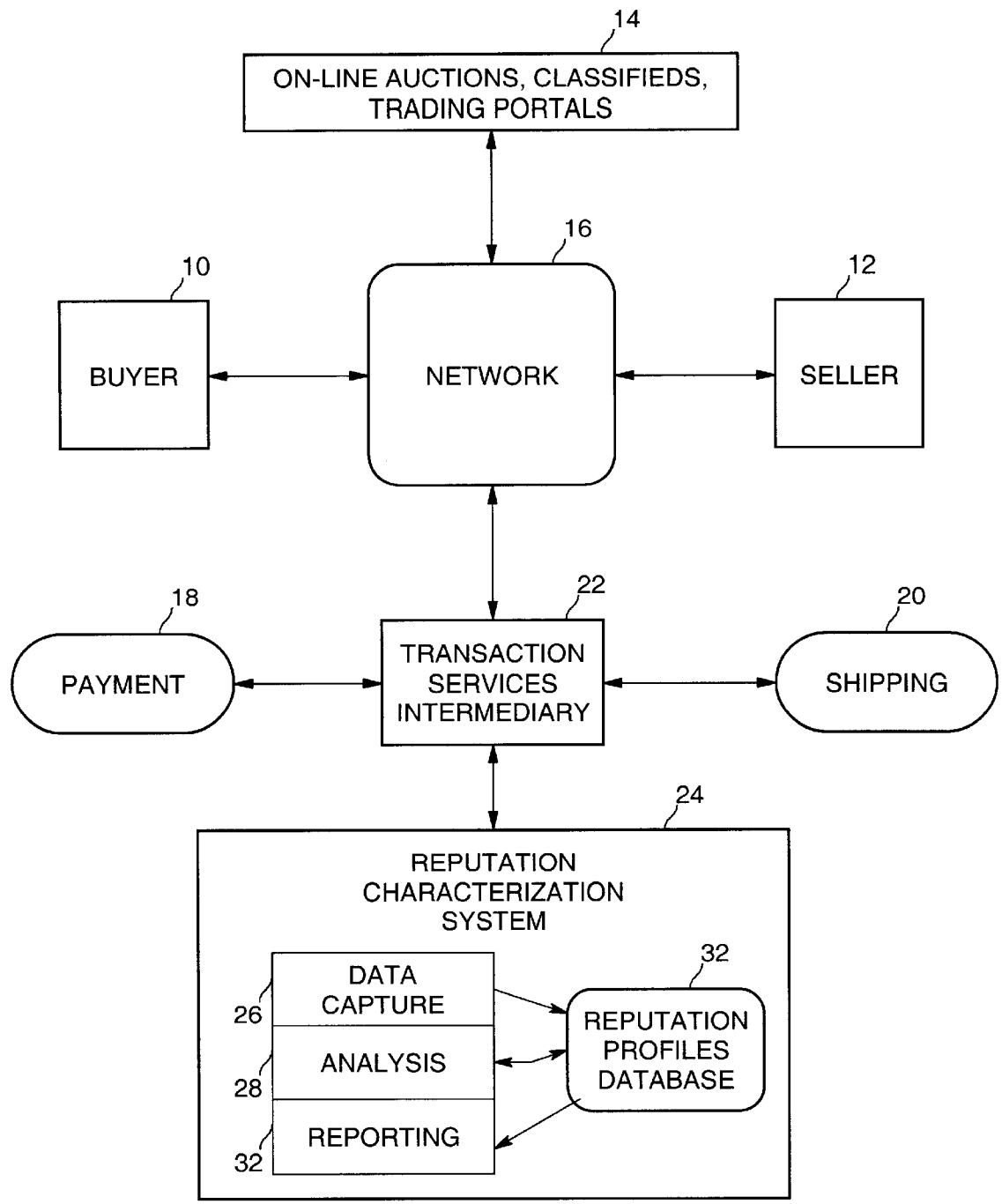
FIG. 1 is a diagram of a person-to-person electronic commerce system providing objective reputation characterization according to an embodiment of the present invention.

Embodiments of the present invention work by interacting with automated transaction fulfillment systems to obtain, store, and report transaction participant performance information. Transaction fulfillment systems for person-to-person electronic commerce web sites automate payment and shipping functions between transaction participants by acting as a trusted intermediary. FIG. 1 is a diagram of a person-to-person electronic commerce system providing objective reputation characterization according to an embodiment of the present invention. A buyer 10 and a seller 12 may "meet" in cyberspace at a web site run by an on-line auction house, classified advertising manager, or trading portal 14 (generally referred to herein as "auction site"). As is well-known in the art, buyers and sellers may visit the auction site by using browser and network connectivity software running on a machine such as a personal computer (PC) system, handheld communications device, cellular telephone, personal digital assistant (PDA), or other device. The buyer 10, seller 12, and auction site 14 may be connected via a communications network 16, such as the Internet. The buyer and seller interact with each other on-line in any one of numerous transaction types. One such transaction type is an auction. When a transaction is entered into by the buyer and seller, transaction fulfillment functions such as payment 18 and shipping 20 may be provided by transaction services intermediary 22.

Transaction services intermediary 22 may be a system affiliated with the on-line auction site 14 to enable buyers and sellers to complete transactions begun at the auction site. In some embodiments, transaction services intermediary 22 may be integral with the on-line auction processing provided by the auction site, or it may be provided by a separate commercial entity as a service to the auction site and the transaction participants. Transaction services intermediary may communicate with auction site 14 via a public network such as the Internet as shown in FIG. 1, or via a private connection. Transaction services intermediary receives information about the transaction from the auction site 14, the buyer 10, and the seller 12 and coordinates fulfillment of these functions by interacting with other entities such as shipping and delivery companies, credit card companies, banks, credit unions, credit reporting companies, etc. For example, the buyer may provide information such as his or her name, billing address, shipping address, credit card information, bank account information, and delivery parameters. The seller may provide information such as his or her name, address, description of the goods sold, desired shipping parameters, and so on. The auction site may provide information such as a transaction identifier, transaction time and date, sales commission percentage, etc. The transaction services intermediary then arranges for shipping of the goods by the seller, and payment, either directly or indirectly, by the buyer to the seller.

Because the transaction services intermediary is a trusted agent of the buyer, seller, and auction house, an embodiment of the present invention may be employed in conjunction with the transaction services intermediary to collect, store, and report objective reputation feedback information based on actual performance characteristics of the parties.

Reputation characterization system 24 may be coupled to transaction services intermediary 22 to generate an objective reputation for buyer 10 and seller 12. Reputation characterization system comprises at least data capture component 26, analysis component 28, reporting component 30, and reputation profiles database 32. Data capture component 26 receives notifications from the transaction services intermediary whenever a notable deadline for some performance relating to the transaction has been set. For example, once a transaction has commenced, the seller may be expected to drop off the merchandise to a shipper within 48 hours. Once the data capture component receives the subsequent notification from the transaction services intermediary that the merchandise has in fact been dropped off by the seller and is now in the hands of the shipper, the data capture component may pass this and other information to the analysis component via the reputation profiles database 32.

Although the example of merchandise delivery to the shipper has been noted here, it is understood that transaction parameters may include many other items and behavior indicators that may be used to draw a conclusion about the reputation of the buyer and seller, such as, but not limited to, improper addressing of goods for delivery by the seller, timeliness of delivery to the shipper, timeliness of payment, payment defaults, amount of time after the transaction commences that the buyer received the goods, whether the buyer returned the goods, existence of charge-backs on the buyer's credit card, prior claims of fraud by the buyer or seller, time of payment to the shipper, and claims against shipping insurance, for example.

Analysis component 28 builds objective end-user reputation profiles for buyers and sellers based on the raw transaction data provided by the data capture component. Carrying forward the earlier example, the analysis component combines the deadline, performance, and end-user information provided by the data capture component and draws an objective conclusion as to how timely was the seller's shipping drop-off performance. Other factors may also be considered as part of the overall reputation as noted above, and various algorithms may be employed in different embodiments to combine and/or weight the different performance factors in arriving at the overall reputation. Hence, a reputation number or rating may be a composite of various factors. In one embodiment, the overall reputation may be represented on a scale of 1 to 10, for example, with 10 indicating a trustworthy buyer or seller, and 1 indicating an untrustworthy buyer or seller. Over time and multiple transactions, the performance related metrics present a fair and objective picture of the buyer's or seller's reputation in the person-to-person electronic commerce system.

The generated reputation profiles may be stored in the reputation profiles database 32. The reporting component takes the reputation profile created by the analysis component and publishes or otherwise distributes the information to those interested in acquiring that information. In one embodiment, the information may be displayed on demand at a web site using common gateway interface (CGI) scripts to present the latest reputation information to an interested party. In one embodiment, the reputation information may be displayed by the auction site during the auction or other commercial transaction so that the buyers and sellers are aware of the reputations prior to committing to a given transaction. In another embodiment, the reputation profile may be communicated by other means, such as electronic mail, for example.

Figure 2:
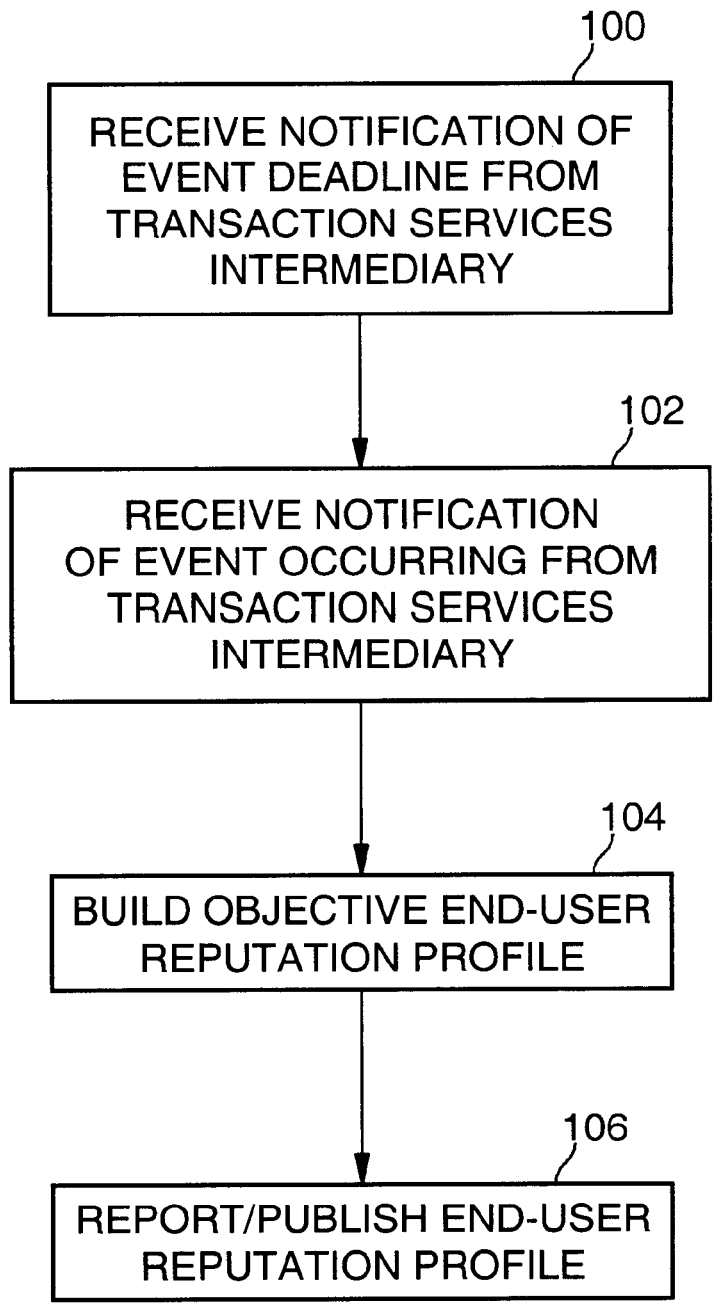
FIG. 2 is a flow diagram illustrating objective reputation characterization in a person-to-person electronic commerce system according to an embodiment of the present invention.

FIG. 2 is a flow diagram illustrating objective reputation characterization in a person-to-person electronic commerce system according to an embodiment of the present invention. At block 100, the reputation characterization system receives a notification of an event deadline from the transaction services intermediary. For example, the event may be the scheduled drop off of the merchandise at the shipper by the seller, or the forwarding of payment information by the buyer to the transaction services intermediary. The reputation characterization system keeps track of all event deadlines. At block 102, the reputation characterization system receives a notification of an event that has occurred for a particular transaction from the transaction services intermediary. Continuing the above examples, the event may be the actual drop-off of the merchandise by the seller at the shipper or payment authorization by the buyer (that is, actual performance by buyer or seller of an action related to the transaction). At block 104, the reputation characterization system builds an objective end-user reputation profile based at least in part on the event deadlines and event notifications received from the transaction services intermediary. Any combination of information that gives an indication as to whether the buyer or seller is trustworthy may be used to generate the profile. At block 106, the reputation characterization system may report or publish the reputation profiles for end-users (buyers and sellers). This information may be provided upon request by a user, or may simply be available in a list of reputations for person-to-person electronic commerce participants.

Embodiments of the present invention are superior to subjective reputation feedback mechanisms that are currently prevalent because it reduces bias, error, and inaccuracies inherent in those approaches. By unobtrusively monitoring the payment, shipping, returns, defaults, and other quantifiable events that take place during the transaction fulfillment stage, the system is able to generate an objective reputation profile that reflects a buyer's or seller's performance in actual transactions. A potential transaction partner can then look at this profile and decide whether the individual can be trusted to perform in the future based on his or her past conduct.

In the preceding description, various aspects of the present invention have been described. For purposes of explanation, specific numbers, systems and configurations were set forth in order to provide a thorough understanding of the present invention. However, it is apparent to one skilled in the art having the benefit of this disclosure that the present invention may be practiced without the specific details. In other instances, well-known features were omitted or simplified in order not to obscure the present invention.

Embodiments of the present invention may be implemented in hardware or software, or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system embodying the reputation characterization system components includes any system that has a processor, such as, for example, a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a removable storage media or device (e.g., floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

Figure 3:
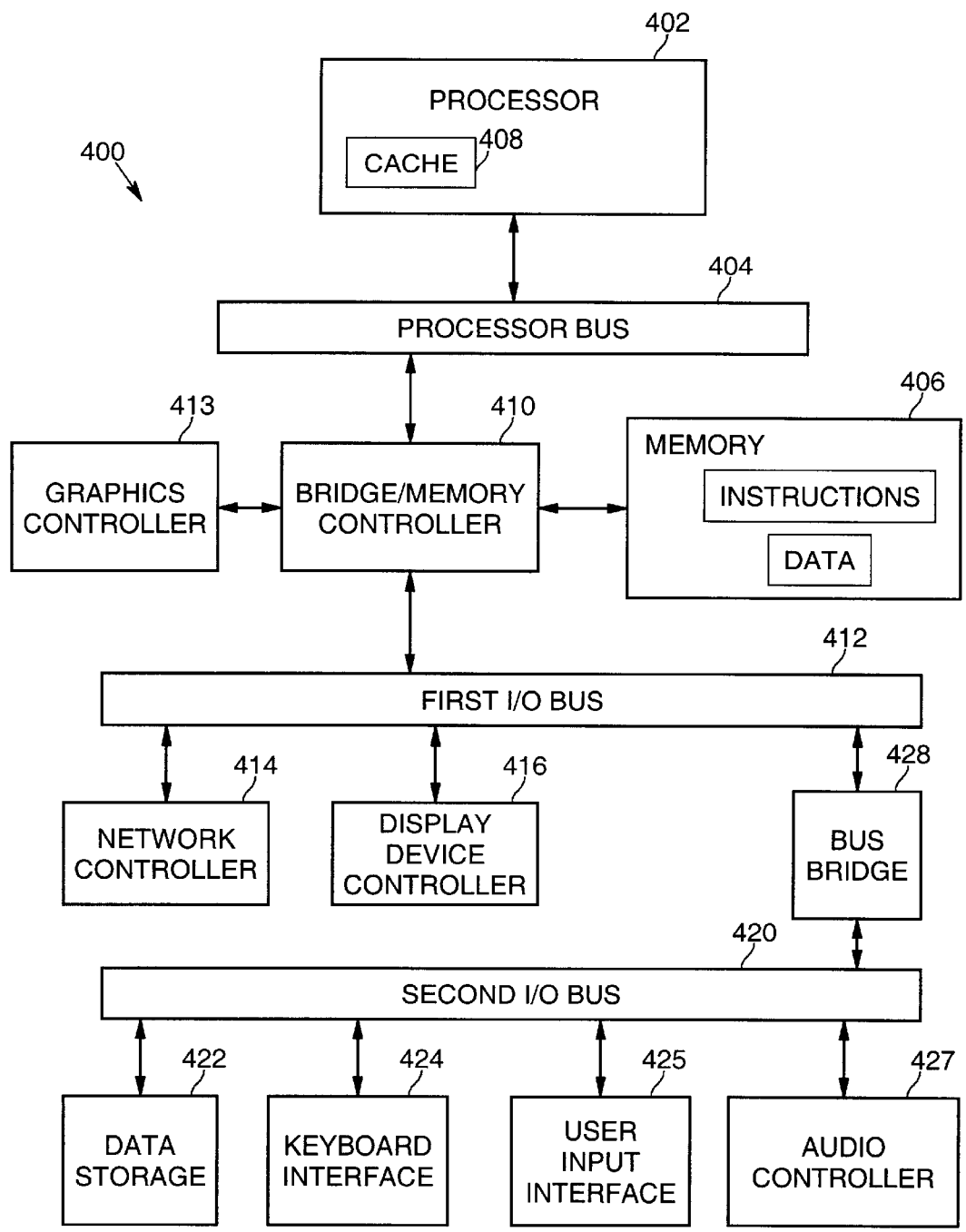
FIG. 3 is a diagram of a sample computer system for implementing a reputation characterization system according to an embodiment of the present invention.

An example of one such type of processing system is shown in FIG. 3, however, other systems may also be used and not all components of the system shown are required for the present invention. Sample system 400 may be used, for example, to execute the processing for embodiments of the reputation characterization system, in accordance with the present invention, such as the embodiment described herein. Sample system 400 is representative of processing systems based on the PENTIUM®II, PENTIUM® III, and CELERON™ microprocessors available from Intel Corporation, although other systems (including personal computers (PCs) having other microprocessors, engineering workstations, other set-top boxes, and the like) and architectures may also be used.

FIG. 3 is a block diagram of a system 400 of one embodiment of the present invention. The system 400 includes a processor 402 that processes data signals. Processor 402 may be coupled to a processor bus 404 that transmits data signals between processor 402 and other components in the system 400.

System 400 includes a memory 406. Memory 406 may store instructions and/or data represented by data signals that may be executed by processor 402. The instructions and/or data may comprise code for performing any and/or all of the techniques of the present invention. Memory 406 may also contain additional software and/or data (not shown). A cache memory 408 may reside inside processor 402 that stores data signals stored in memory 406.

A bridge/memory controller 410 may be coupled to the processor bus 404 and memory 406. The bridge/memory controller 410 directs data signals between processor 402, memory 406, and other components in the system 400 and bridges the data signals between processor bus 404, memory 406, and a first input/output (I/O) bus 412. In this embodiment, graphics controller 413 interfaces to a display device (not shown) for displaying images rendered or otherwise processed by the graphics controller 413 to a user.

First I/O bus 412 may comprise a single bus or a combination of multiple buses. First I/O bus 412 provides communication links between components in system 400. A network controller 414 may be coupled to the first I/O bus 412. In some embodiments, a display device controller 416 may be coupled to the first I/O bus 412. The display device controller 416 allows coupling of a display device to system 400 and acts as an interface between a display device (not shown) and the system. The display device receives data signals from processor 402 through display device controller 416 and displays information contained in the data signals to a user of system 400.

A second I/O bus 420 may comprise a single bus or a combination of multiple buses. The second I/O bus 420 provides communication links between components in system 400. A data storage device 422 may be coupled to the second I/O bus 420. A keyboard interface 424 may be coupled to the second I/O bus 420. A user input interface 425 may be coupled to the second I/O bus 420. The user input interface may be coupled to a user input device, such as a remote control, mouse, joystick, or trackball, for example, to provide input data to the computer system. An audio controller 427 may be coupled to the second I/O bus for handling processing of audio signals through one or more loudspeakers (not shown). A bus bridge 428 couples first I/O bridge 412 to second I/O bridge 420.

Embodiments of the present invention are related to the use of the system 400 as a reputation characterization system. According to one embodiment, such processing may be performed by the system 400 in response to processor 402 executing sequences of instructions in memory 404. Such instructions may be read into memory 404 from another computer-readable medium, such as data storage device 422, or from another source via the network controller 414, for example. Execution of the sequences of instructions causes processor 402 to execute reputation characterization processing according to embodiments of the present invention. In an alternative embodiment, hardware circuitry may be used in place of or in combination with software instructions to implement embodiments of the present invention. Thus, the present invention is not limited to any specific combination of hardware circuitry and software.

The elements of system 400 perform their conventional functions in a manner well-known in the art. In particular, data storage device 422 may be used to provide long-term storage for the executable instructions and data structures for embodiments of the reputation characterization system in accordance with the present invention, whereas memory 406 is used to store on a shorter term basis the executable instructions of embodiments of the reputation characterization system in accordance with the present invention during execution by processor 402.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method of facilitating transactions in a person-to-person electronic commerce system comprising:

receiving a notification of a deadline relating to a transaction event;

receiving a notification of the transaction event occurring corresponding to the deadline; and building an objective reputation profile of a transaction participant by an objective third party participating in fulfillment of the transaction based at least in part on the notifications.

2. The method of claim 1, further comprising publishing the reputation profile.

3. The method of claim 1, wherein receiving the notifications comprises receiving the notifications from a transaction services intermediary.

4. The method of claim 1, wherein the reputation profile represents a trust indicator of the transaction participant.

5. The method of claim 1, wherein transaction participants comprise a buyer and a seller conducting a transaction in an on-line auction and the reputation profile represents a trust indicator of at least one of the buyer and the seller.

6. The method of claim 1, wherein building the objective reputation profile comprises building the objective reputation profile automatically based on actual performance characteristics of the transaction event by the transaction participants.

7. The method of claim 6, wherein automatically building the objective reputation profile based on actual performance characteristics of the transaction event comprises building the objective reputation profile automatically and objectively based on raw transaction data, without receiving subjective feedback from at least one of the transaction participants.

8. The method of claim 6, wherein the transaction participants are a buyer and a seller, and the transaction event comprises payment for goods.

9. The method of claim 6, wherein the transaction participants are a buyer and a seller, and the transaction event comprises shipping of goods from a seller to a buyer.

10. The method of claim 1, wherein the objective reputation profile represents an objective measurement of actual performance of the transaction participant during transaction fulfillment without subjective feedback provided by another transaction participant.

11. An article comprising: a storage medium having a plurality of machine readable instructions, wherein when the instructions are executed by a processor, the instructions cause a reputation characterization system to receive a notification of a deadline relating to a transaction event, to receive a notification of the transaction event occurring corresponding to the deadline, and to build an objective reputation profile of a transaction participant by an objective third party participating in fulfillment of the transaction based at least in part on the notifications.

12. The article of claim 1, wherein the instructions further comprise instructions to publish the reputation profile.

13. The article of claim 12, wherein the instructions to receive the notifications comprise instructions to receive the notifications from a transaction services intermediary.

14. The article of claim 12, wherein the reputation profile represents a trust indicator of a transaction participant.

15. The article of claim 12, wherein transaction participants comprise a buyer and a seller conducting a transaction in an on-line auction and the reputation profile represents a trust indicator of at least one of the buyer and the seller.

16. The article of claim 11, wherein instructions for building the objective reputation profile comprise instructions for building the objective reputation profile automatically based on actual performance characteristics of the transaction event by the transaction participants.

17. An objective reputation characterization system for use in a person-to-person electronic commerce system, comprising:

a data capture component to receive a first notification of a deadline relating to a transaction event and to receive a second notification of the transaction event occurring corresponding to the deadline; and an analysis component to build an objective reputation profile of a transaction participant by an objective third party participating in fulfillment of the transaction based at least in part on the notifications.

18. The system of claim 17, further comprising a database coupled to the data capture component and the analysis component to store the notifications and the reputation profiles for transaction participants.

19. The system of claim 17, wherein the objective reputation characterization system is coupled to a transaction services intermediary, the transaction services intermediary providing transaction fulfillment services to the transaction participants and providing the notifications to the data capture component.

20. The system of claim 19, wherein the transaction fulfillment services comprise payment and shipping functions.

21. The system of claim 17, further comprising a reporting component to communicate the reputation profile to users of the person-to-person electronic commerce system.

22. The system of claim 17, wherein the reputation profile represents a trust indicator of the transaction participant.

23. The system of claim 17, wherein the analysis component builds the objective reputation profile automatically based on actual performance characteristics of the transaction event by the transaction participants.

24. A person-to-person electronic commerce system comprising:

a web site facilitating person-to-person commercial transactions between transaction participants;

a transaction services intermediary to provide transaction fulfillment services to transaction participants; and an objective reputation characterization system to create objective reputation profiles of the transaction participants based at least in part on performance by the participants of actions relating to transaction fulfillment.

25. The electronic commerce system of claim 24, wherein the objective reputation characterization system comprises:

a data capture component to receive a first notification of a deadline relating to a transaction event and to receive a second notification of the transaction event occurring corresponding to the deadline, the notifications being sent by the transaction services intermediary; and an analysis component to build the objective reputation profile of each transaction participant based at least in part on the notifications.

26. The system of claim 24, wherein the transaction services intermediary comprises an automated transaction fulfillment system to obtain, store, and report objective reputation feedback information based on actual performance characteristics of the transaction participants.

* * * * *